Dec. 26, 1939.  G. C. HARTLEY ET AL  2,184,523
PRIVATE BRANCH EXCHANGE SYSTEM
Filed April 16, 1938  9 Sheets-Sheet 7

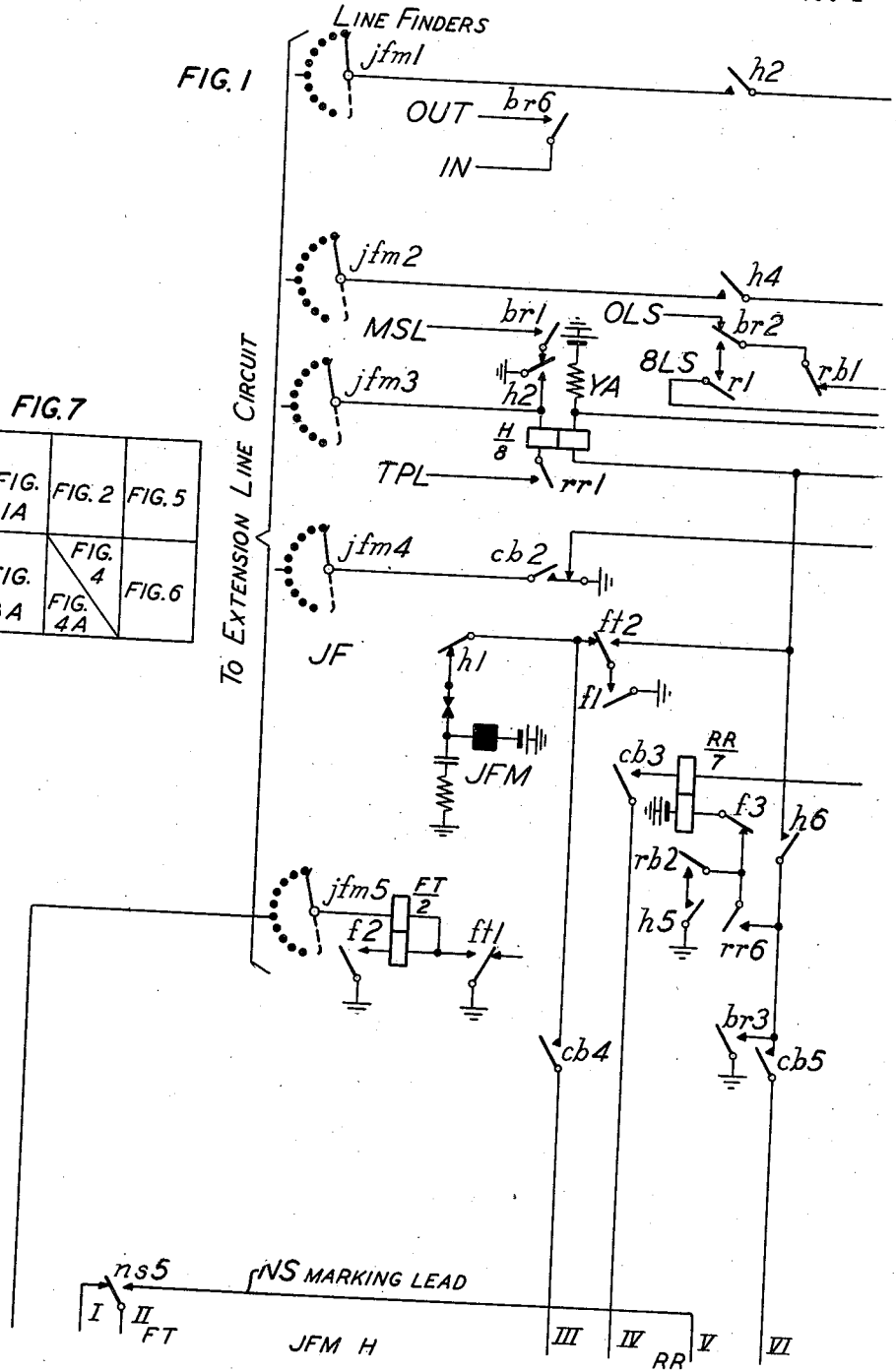

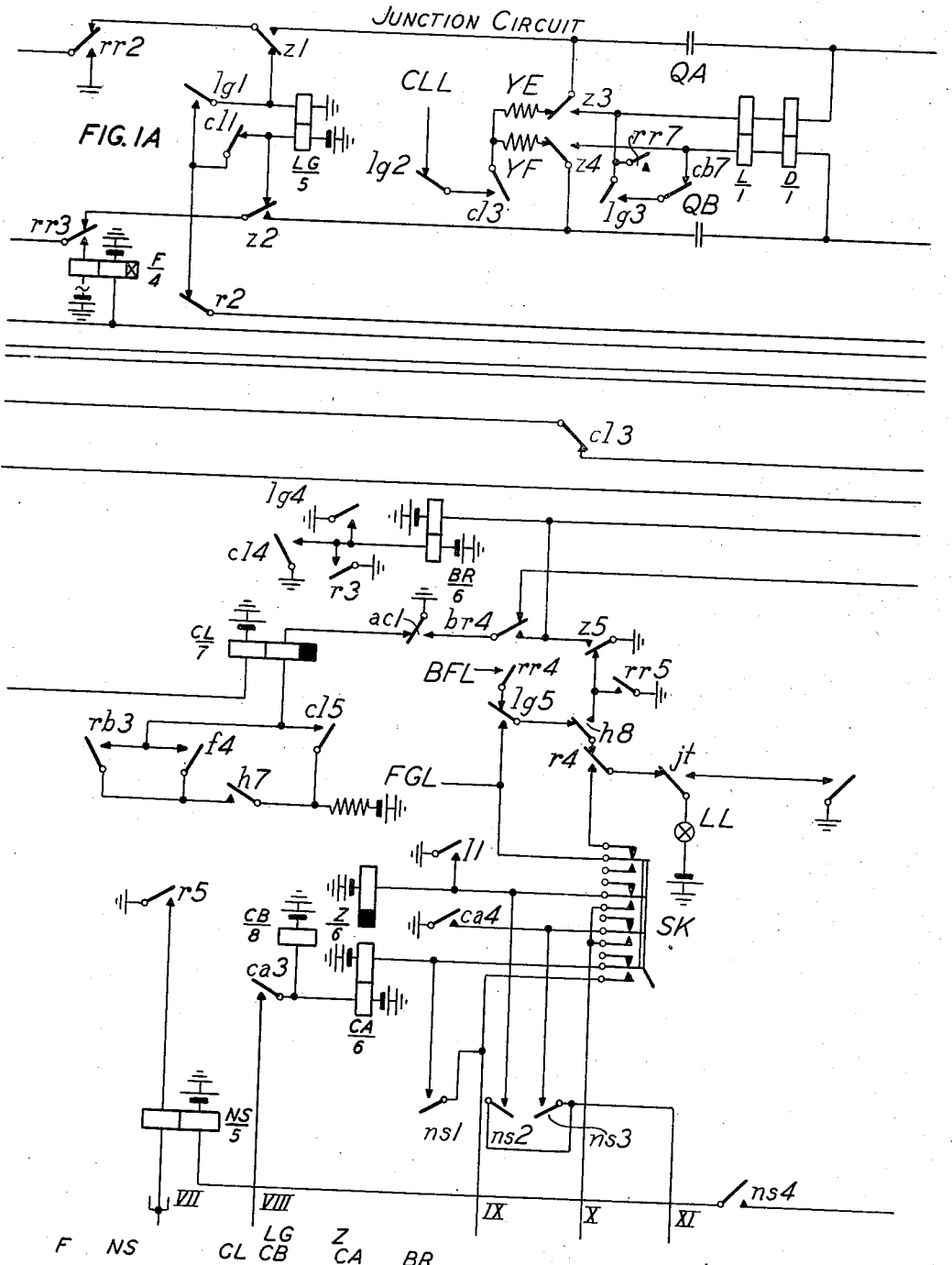

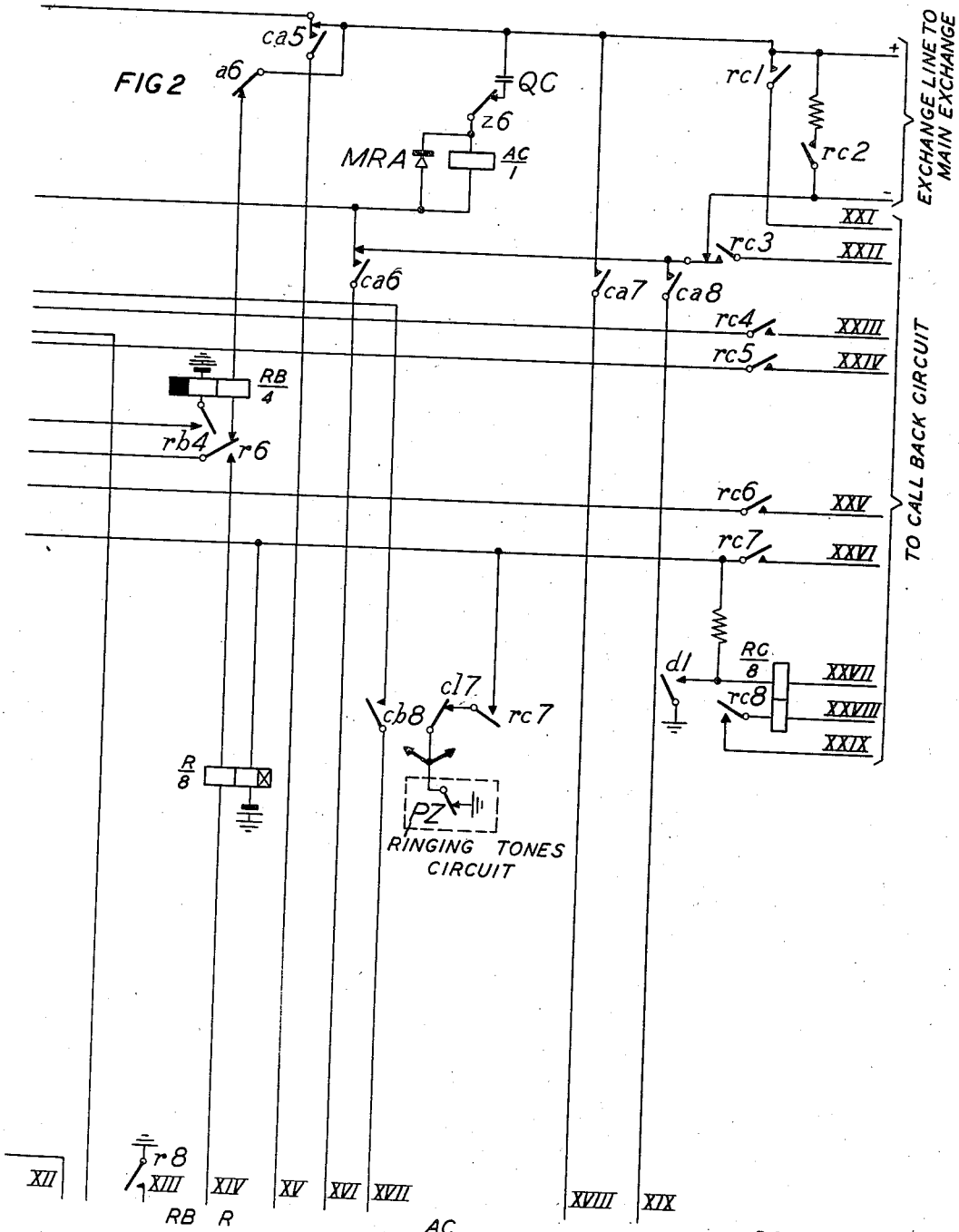

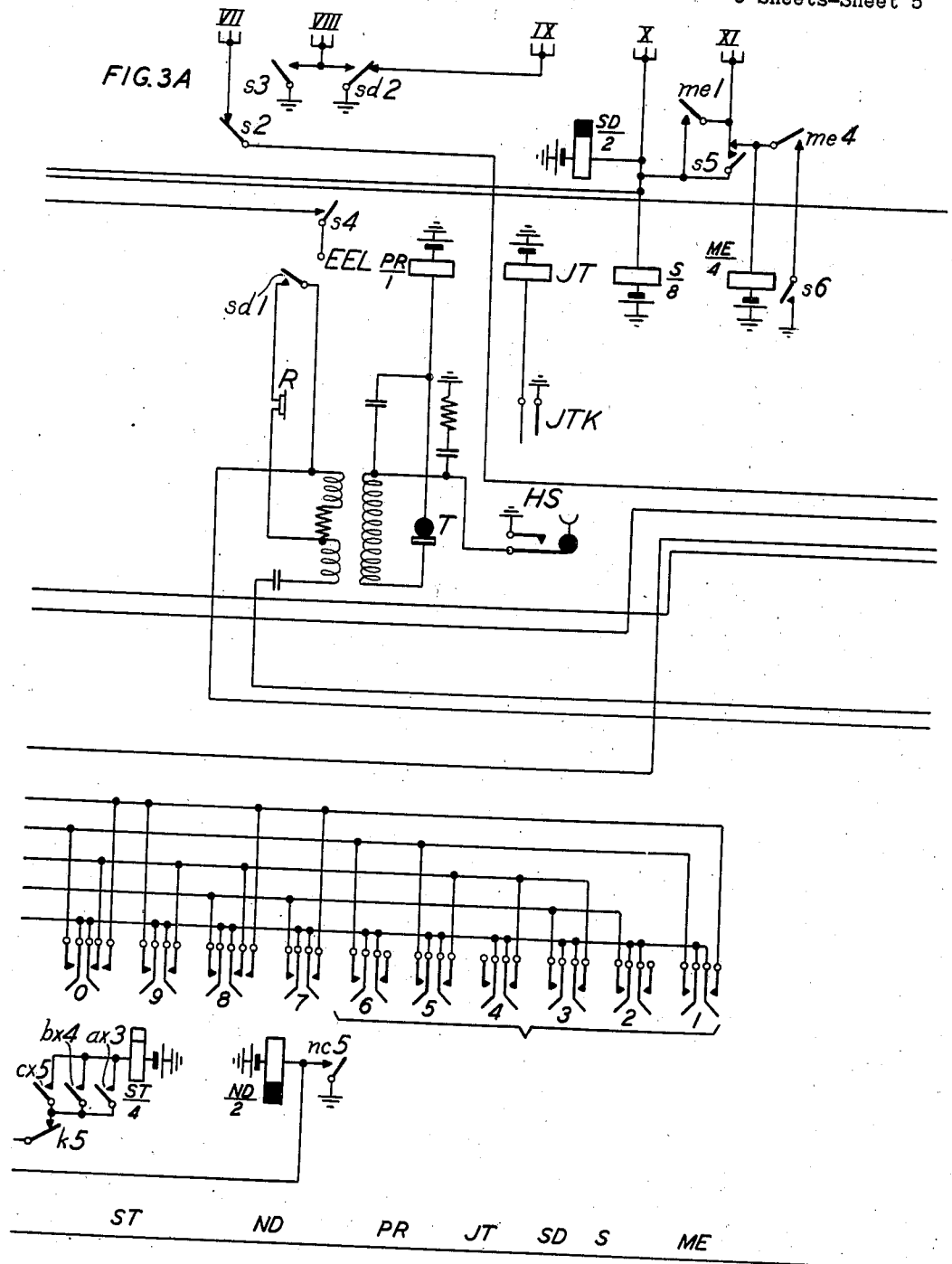

INVENTORS: G.C. HARTLEY
M.S. SNELL
BY
ATTORNEY

Patented Dec. 26, 1939

2,184,523

UNITED STATES PATENT OFFICE 2,184,523

PRIVATE BRANCH EXCHANGE SYSTEM

George C. Hartley and Maurice Susan Snell, London, England, assignors to Western Electric Company, Incorporated, New York, N. Y., a corporation of New York Application April 16, 1938, Serial No. 202,428
In Great Britain August 17, 1937

7 Claims. (Cl. 179—27)

This invention relates to semi-automatic telephone exchange systems.

The object of the invention is to simplify and accelerate the setting up and transfer of connections by attendants and more particularly, though not exclusively, of incoming connections to private automatic branch exchanges.

One feature of the invention comprises a semi-automatic telephone exchange system comprising attendant's section-controlling equipment so arranged that an attendant breaks down an initiated connection from a calling party to a first called party and initiates the setting up of a connection from the calling party to a second called party by an operating procedure similar to that used in setting up the initial connection without any additional call-canceling operation.

A second feature of the invention comprises a semi-automatic telephone or like exchange system comprising attendant's selection-controlling equipment so arranged that the operations which may have to be performed by an attendant to break down a connection already set up from a calling party to a first called party and to transfer the connection to a second called party are identical with those performed by the attendant to set up an initial connection from a calling party to said second called party.

The invention will be clearly understood from the following description of the invention shown in the accompanying drawings in which:

Figs. 1, 1A, 2, 3, 3A, 4, 5 and 6 arranged in accordance with Fig. 7 show the applicant's invention applied to an automatic branch exchange system in which "night service" is provided by having incoming calls cause the operation of bells or buzzers at different points in the buildings which the exchange serves and having any extension subscriber answer the incoming call by dialing the digit 8;

Figs. 1, 1A and 2 show an automatic branch exchange junction line circuit terminating in a line finder;

Figs. 3, 3A and 4 show a key-sending cordless position equipment;

Figure 4:
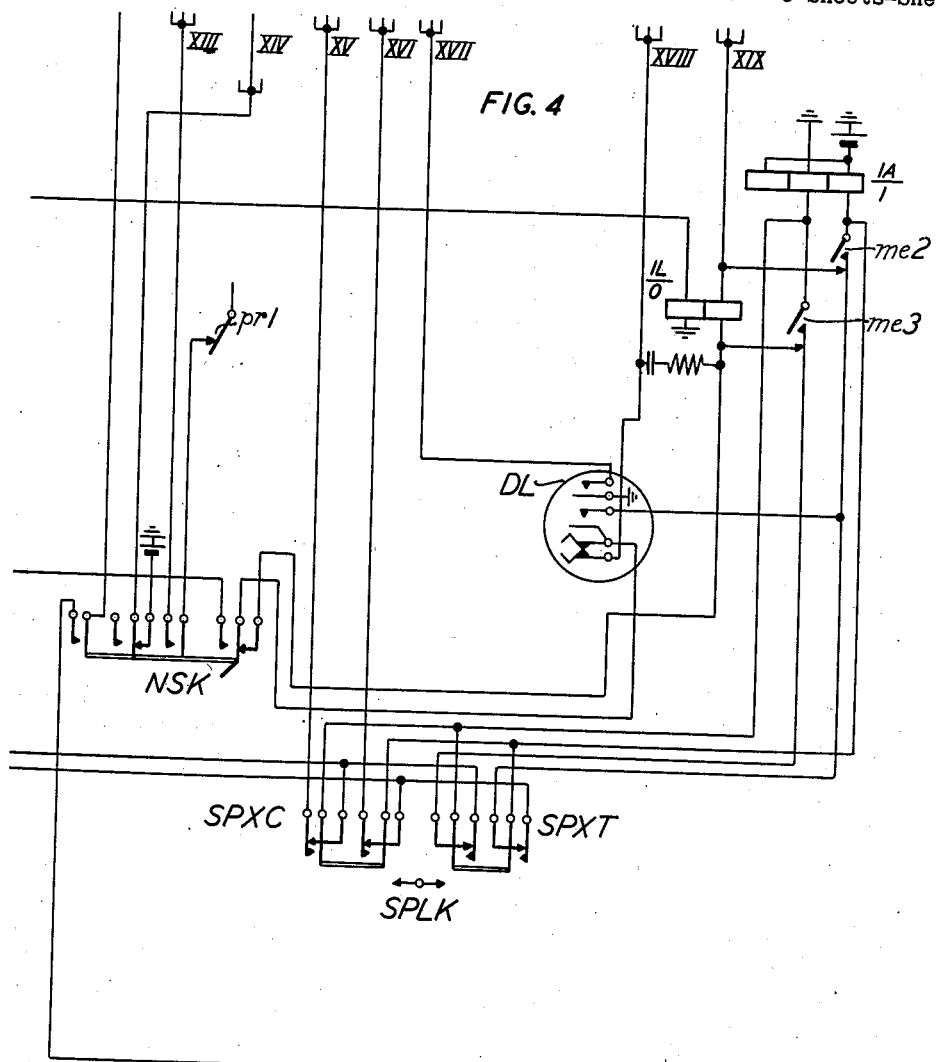
Figure 4A:
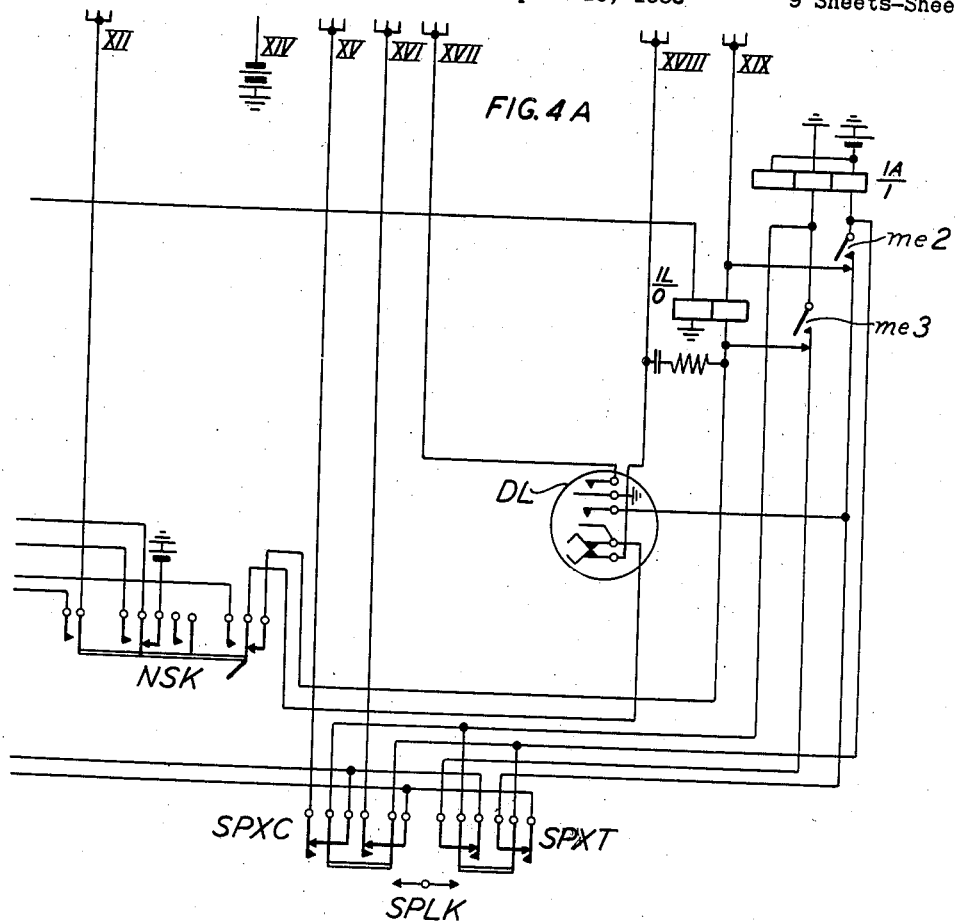

Figs. 1, 1A, 2, 3, 3A, 4, 4A, 5 and 6 arranged in accordance with Fig. 7 show the applicants' invention applied to an automatic branch exchange system in which "night service" is provided by having a particular extension allocated for this service to each junction;

Fig. 4A shows the principal changes required for this latter type of service.

The invention will first be described in general in connection with the Figs. 1, 1A, 2, 3, 4, 4A, 5 and 6 and later specifically in connection with the two "night service" arrangements, using Fig. 4 in the first instance and Fig. 4A in the second instance.

The key-sending equipment comprises a digit key or press-button strip 0—1, Fig. 3A, adapted to control digit storage relay groups AX—CX, and AY—DY. Contacts of the storage relays mark bank $jfm4$, Fig. 1, of the junction line finders via cross-connecting frame CCF. If the number of extension lines is small, a key or press-button per extension line may be provided to mark the junction line-finder banks direct.

The attendant's set may be provided with a speak key SK, Fig. 1, per junction, but a double-throw key is preferably provided for each pair of junctions.

When a call is made from the main exchange by ringing over a junction to the private automatic branch exchange, relay RB energizes immediately to ringing return battery at the main exchange even during an initial silent period, earth, $cb2$, $r6$, RB, $a6$, and positive junction wire. Contacts $rb1$ open the start circuit from the 0 level and 8 level start leads 0LS, 8LS of the local links so as to busy the junction to outgoing calls.

Ringing current operates relay AC, positive wire QC, $z6$, AC, $rc3$, negative wire.

Earth via $ac1$, $br4$, energizes R, which locks on its left-hand winding via $r6$, $cb2$, and on its right-hand winding via $rc1$, $c17$, back contacts of a relay PZ (not shown) in the ringing and tones circuit to earth.

BR now operates and connects flicker ground via FGL, speak key SK of the attendant's circuit, $r4$, back contact of junction test relay JT of the attendant's circuit, to line lamp LL. A buzzer may also be sounded.

Contacts $br1$ connect earth from $h2$, to the ringing and tones machine start lead MSL. Relay PZ is arranged to operate every half minute after the machine has been started to release relay R if the connection has not been completed, and if key NSK in Fig. 4 is thrown.

When the attendant throws the speak key, relay CA operates via SK, lead IX, $sd2$ in the attendant's circuit earth. Relays S, SD in the attendant's circuit operate via lead X, SK, $ca4$. The change-over of contacts $sd2$ renders all other junction speak keys ineffective. CA locks over its lower winding, $ca3$, lead VIII, to contacts $s3$, $sd2$, in the attendant's circuit, and CB operates in parallel with CA. Z energizes via two pairs of SK contacts and ca4.

Ringing is tripped via positive junction lead ca7, lead XVIII contacts of DL, NSK, right-hand winding of coil IL, lead XIX, ca8, rc3, negative junction lead.

The attendant inquires the wanted number, lead XVIII contacts of DL, NSK, me3, contacts SPXT of splitting key SPLK, attendant's telephone set, SPXT, me2, lead XIX.

Let us assume that the wanted number is 22. The attendant sets up the number on her key-set 1—0. Relay AX only of the storage relay combination AX—CX energizes AX, y4, key 2, sz6, k4, nu1, s1. AX locks via ax1 in series with Y to the same earth. Y energizes and transfers the key leads from relays AX—NU to the second digit storage relay set AY—DY.

It will be noticed that relay Nu, the fourth relay of the first storage set is connected to keys 1, 7, 8, 9, 0, and when operated thereby locks direct to s1, and opens the energizing circuit for Y in series with relays AX, BX, CX, so as to prevent registration of any one of said digits which are not used as first digits in the private automatic branch exchange. NU tone via lead NUT, nu2, and coil IL, is induced in the attendant's receiver.

When a first digit is correctly registered, ST energizes via ax3 (or bx4, or cx5), k5, nu1, s1.

The first digit having been registered on AX, key 2 is again depressed and AY is operated and locks in series with SZ which also energizes and disconnects the keyset at sz6.

Earth via st2, k3, q1, sz4, lead III, cb4, h1, and its interrupter, energizes magnet JFM of the 50-point single motion junction line-finder switch, which hunts for a marked line.

Contacts 1—50 of the cross-connecting frame CCF in the attendant's circuit are connected to the corresponding fifty contacts in the bank of wiper jfm4. The group of ten lines including the wanted party is first marked and relay Q operates when the group is found via st4, nc1, o3, ax2 operated, bx2, cx2, contact 1 of CCF to the first group of lines on JF, jtm4, cb2 to earth.

Operation of q1 immediately stops JF and also operates 0 to st2. 0 locks via o2, st2 and changes the connection of Q from the group marking wires to the line-marking wires. It is to be understood that the line-marking wires are multiplied over all the CCF groups.

Q releases and JFM reoperates. When the marked line in the selected group is reached Q energizes via st4, o3, aya, by2, cy2, dy2, jfm4, cb2 to earth. Slow-to-operate relay K now energizes fully via o1, q1, k3, st2 and locks via o1, k3, st2. The opening of k5 causes ST to release slowly and the opening of k4, immediately releases the storage relays AX, AY and relays Y, SZ, Q. K, and O.

Relays CL and RR in series in the junction circuit energize via cb3, lead IV, st1, k2, during deenergization of ST.

RR locks via f3, rr6, cb5, lead VI, k1, and CL locks earth ac1, CL, cl5, battery.

Since both locking circuits for R are now opened at cb2 and cl7, R releases.

If the speak key SK had been returned before the call was properly set up, that is, before R is released, LL would flicker until the speak key was again thrown and the call completed.

Relay H tests the condition of the wanted subscriber's line by means of intermittent potential on lead EPL.

If the line is busy; H does not operate and busy flash is connected via BFL, rr4, lg5, h8, r4, contact of JT to LL.

If or when the subscriber is free, H operates and locks via h6, cb5, lead VI, st3, and LL glows steadily in a circuit via JT contacts, r4, h8, rr5. The wanted party is rung, ringing source, winding of F, rr3, h4, jfm2, wanted party's bell, jfm1, h2, rr2, earth.

When the subscriber replies, F operates, and at f3 releases RR which releases F.

When the speak key is returned to normal, S and SD in the attendant's circuit release, and release CA and CB so that a conversational circuit is completed; junction positive wire, rc1, ca5, upper windings of D and L, z3, z1, rr2, h2, jfm1, extension loop jfm2, hr, rr3, z2, z4, lower windings of L and D, rc3, junction negative. Relay L immediately operates and holds Z and L1. The relays now energized are L, Z, H, CL, BR.

The attendant may find it necessary to rekey and so transfer the connection to another line in the following cases:

(1) If the called party is busy, and the calling party asks for another extension.

(2) If there is no reply to ringing and the calling party asks for another extension.

(3) If conversational connection has been set up but transfer is required, for instance if the call is really for another party.

In all three cases assuming that the speak key is still thrown, relays CA, CB, S, SD, CL, BR are energized, but the relays RR and H are differently operated in these three different conditions.

In condition (1), relay RR only is energized.

In condition (2), relays RR and H are both energized.

In condition (3), relay H alone is energized.

Whichever of these two relays RR and H is operated, operation of one of the digit keys in setting up a new number automatically releases the said relay or relays.

The depression of the digit key energizes one or more storage relays AX, BX, CX followed by relays Y and ST as before. The locking circuit for RR and H are via f3 and rr6, and via h6 in common via cb5, lead VI, back to st3, to ground. Operation of ST therefore opens both locking circuits and RR and/or H release.

Depression of the second digit key operates one or more storage relays AY—DY and relay Z. As before, JF hunts for the marked group and line in turn and the new line is tested and if idle, rung.

When the call is set up the speak key is restored, S, SD, CA, CB release. The attendant's circuit is back to normal and available for dealing with another call, while in the exchange line circuit, relays L, Z, H, CL, BR are energized as previously stated.

When the private automatic branch exchange extension hangs up, L releases followed by Z. Clearing alternating current may be applied via lead CLL, lg2, cl3, YE and YF, z3 and z4 in parallel to the junction leads. When the impedance of the two parallel alternating current circuits becomes unbalanced due to change-over from the conversation feed circuit to the junction line circuit at the main exchange, and relay AC which is bridged across the circuit energizes, change-over of contacts ac1 releases relay CL but holds BR to prevent R being energized.

Release of CL breaks the clearing circuit at cl2, so that AC and BR release. The opening of contacts br3 releases H and the circuit is back to normal.

If the main exchange subscriber holds the connection, AC does not energize, and CL, BR, and H remain operated after L and Z are released. Lamp LL is then continuously lighted via JT contact, 44, h8, z5. The private automatic branch exchange attendant on observing the lamp comes in and makes inquiries.

If an extension party engaged on an incoming call from the main exchange wishes to call back to another extension while the main exchange call is held, he depresses a subset button which earths both legs of his line. Differential relay D, Fig. 1, energizes and contacts d1 cause RC to operate via lead XXVII to the call-back circuit, Fig. 5, mc4 to battery.

Figure 5:
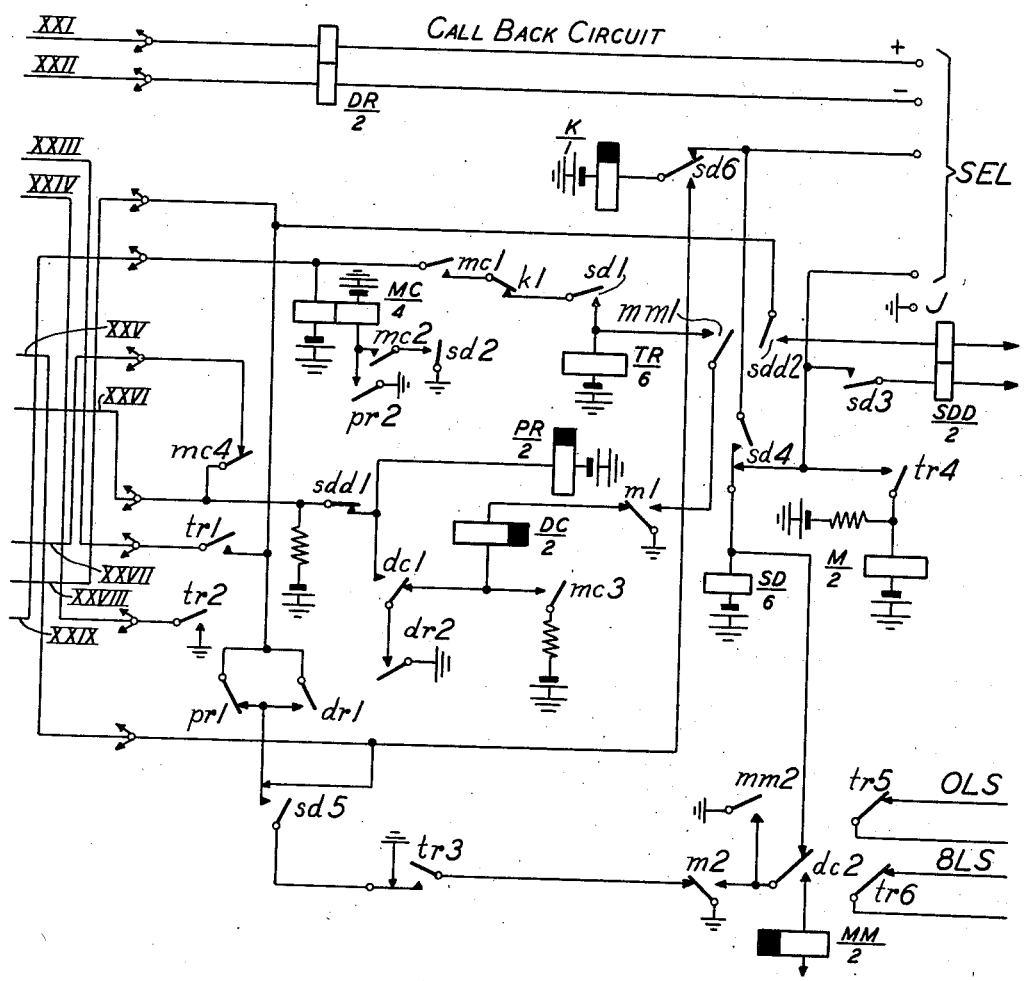
Fig. 5 shows a call-back circuit.

Earth via z5, Fig. 1, rc6, Fig. 2, lead XXV, sd5, Fig. 5, pr1, lead XXVIII, lower winding of RC, Fig. 2, rc8, lead XXIX, left-hand winding of MC, Fig. 5, to battery, locks RC and energizes MC.

The opening of contacts mc4, Fig. 5, prevents any other RC relay's energizing.

The junction line, Fig. 2, is bridged via rc2, to hold the exchange line connection while the extension line is connected via rc1, rc3, via the leads XXI, XXII to the call back circuit in which the said line is connected via a differential relay DR to a spare extension line circuit SEL. While the subset button is still depressed, relay DR is energized.

When DR is released by release of the subset button, relay DC which was short-circuited via dc1, dr2, now energizes; earth m1, DC, mc3, battery.

The calling extension line loop causes the spare line circuit to seize a local link which connects earth to the third wire of SEL to operate K. The extension party now dials into the local link and completes the call back connection.

The local link is so arranged that after the second digit has been dialed, it puts a resistance earth back on the fourth wire in response to which SD operates. SD locks via sd4, to the third wire of the spare line SEL. SDD now energizes via sd3 and the fourth wire of SEL in series with a relay in the local link which sets up a called party release condition, and locks via sdd2, pr1, sd5, tr3, to earth.

If the extension desires to return to the exchange call, he depresses his button again. Relay DR operates and operates relay PR via dc1, dr2. The opening of contacts pr1 transfers the control of relay RC to front contact dr1, so that as soon as DR releases, RC will release during the slow release of PR. The release of RC will cause the local link circuit to release, and will restore the exchange line talking condition via rc1, rc3.

If the extension wishes to transfer the call to the second extension he merely replaces his receiver. This will release the L and Z relays of the junction circuit and z5 disconnects earth from XXV thereby releasing relay K. The local link will not release in this condition since it is in the called party release condition. As a consequence of this relay SD will remain operated and when K releases, relay TR will operate via sd1, k1, mc1 in parallel with MC. TR connects earth to lead XXIII via tr1, pr1, sd5, tr3, m2 and to lead XXIV via tr2, thereby forcing the release of the exchange line circuit H relay and operating relay F. At the same time TR connects relay M in parallel with a 200-ohm resistance to the fourth wire of the spare line circuit SEL; this is extended via the link to a fourth wiper of the connector switch and serves to mark the called extension on the bank jfm5 of the exchange line finder. JF, Fig. 1, hunts for the marked line; JFM, h1, ft2, f1. When the marked line is found relays M and FT, Fig. 1, will operate, and release RC at m2. When M operates, DC releases slowly. During release of DC, M operates MM which via mm2, dc2, connects earth on the third wire of SEL when DC releases. MM has a long release time and maintains this earth for sufficient time to force the release of the guard relay in the local link. SD is released by the local link and the call-back circuit returns to normal. In the exchange line circuit, H reoperates via ft2, f1, and locks. TR, incidentally, disconnects the 8, 9, and 0 level start leads to reserve the multiple exclusively for the use of the call-back circuit during the transfer process.

If the extension wishes to call the attendant he presses his button twice in succession. The first operation establishes the beginning of the call-back condition and relays DC, MC, and K are operated. The second operation without dialing, i. e., prior to the operation of SD extends earth via dr2, dc1, sdd1, lead XXVI, rc7 to relay R in the exchange line. Flicker ground is connected via FGL, SK, r4, JT contacts to flash lamp LL. At the same time PR is operated and releases the call-back circuit as previously described.

The attendants' sets are not permanently attended, and as is usual so-called "night-switching" is provided. This may be provided in either of two ways according to requirements.

In one arrangement using Fig. 4, throwing of the attendant's night-switching key NSK causes buzzers or bells distributed at selected points around the building served by the private automatic branch exchange to be operated when an incoming call arrives. The call can be answered from any extension.

By dialing 8 from an extension to a local link a waiting incoming call is automatically connected to said extension and the local link released.

The call can then be transferred as above to any desired extension.

With the "dial 8" facility wired up in accordance with Fig. 4 and the night-service key thrown, an incoming call operates RB, AC, R, and BR, but R does not lock up since battery has been removed from lead XIV by NSK. Earth via r3, lead XIII, NSK, pr1, lead BUL, operates the buzzers.

Figure 6:
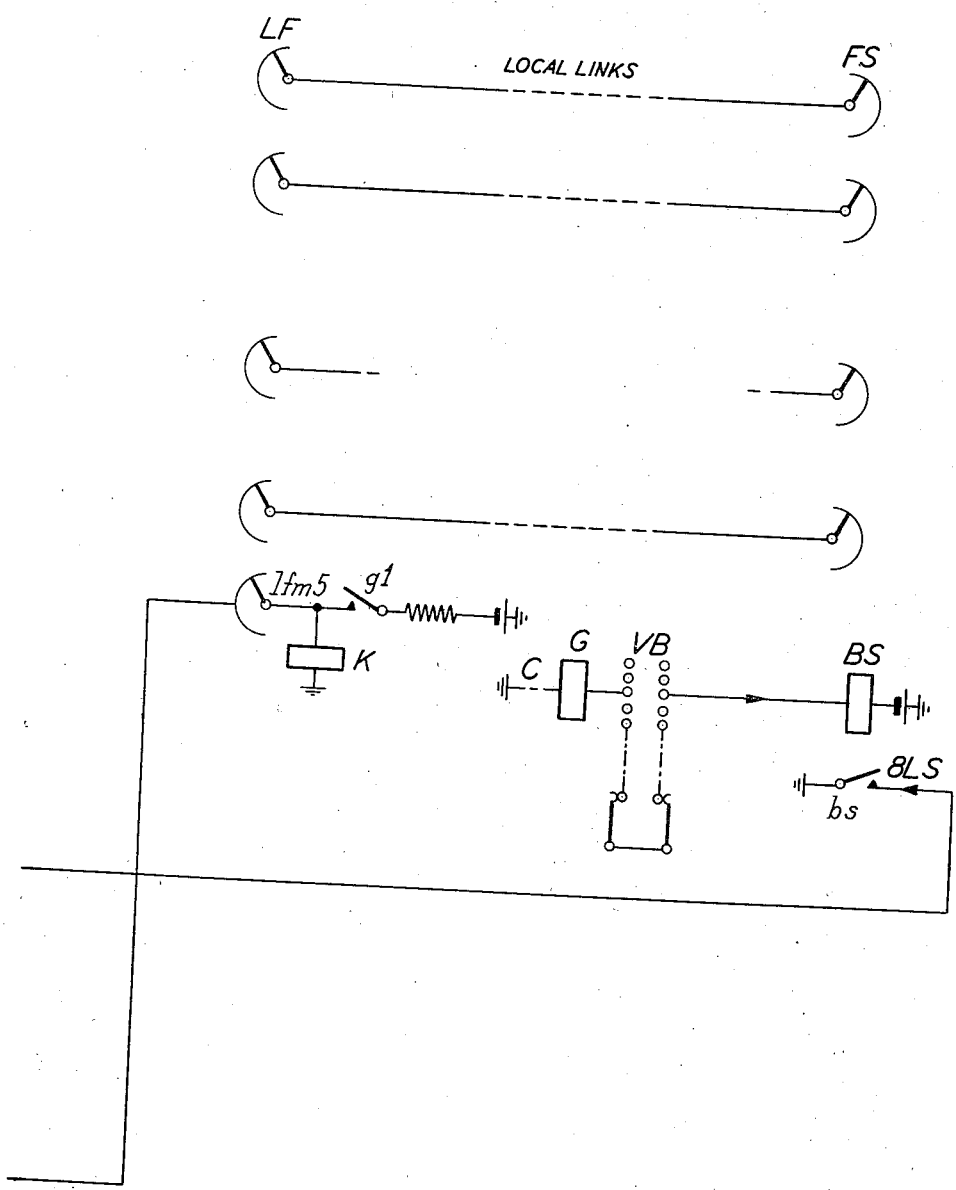
Fig. 6 shows a local link circuit.

On reply by an extension, a local link, Fig. 6, is seized and when digit 8 is received by its up and around selector FS, relay G is operated over the vertical bank VB in series with a common relay BS which connects earth to the lead 8LS. As indicated on NSK, this lead is taken through normally open contacts of NSK to prevent an incoming call being taken out of the attendant's hands in this way when the attendant is present.

This earth via 8LS, Fig. 1, r1, br2, rb1, (since RB was released by R) operates F. JFM is operated via its interrupter, h1, ft2, f1, and JF hunts for the answering extension. When this is found FT energizes; earth, f2, FT, jfm5, lfm5, g1, battery. Contacts ft2, stop JF, and contacts ft1 short-circuit the high resistance winding of FT to cause a relay K in the local link which was held via g1 to release and cause the local link to restore to normal. Relay H is energized via ft2, f1, and locks via h6, cb5, br3.

It will be noticed that the normal ringing trip circuit is through NSK and that this is now open. Ringing from the main exchange is not tripped until after H operates. Relay LG now operates to the extension loop, and at lg3 bridges L on the junction line. L energizes followed by Z which cuts the connection through releasing LG. Relays AC, R, release, followed by F. BR holds to lg4 and z5 in turn and remains operated.

The alternative night service using Fig. 4A operates as follows. On an incoming call with key NSK thrown, relays RB, AC, R, and BR operate as before and R locks via r6, cb2.

Figure 3:
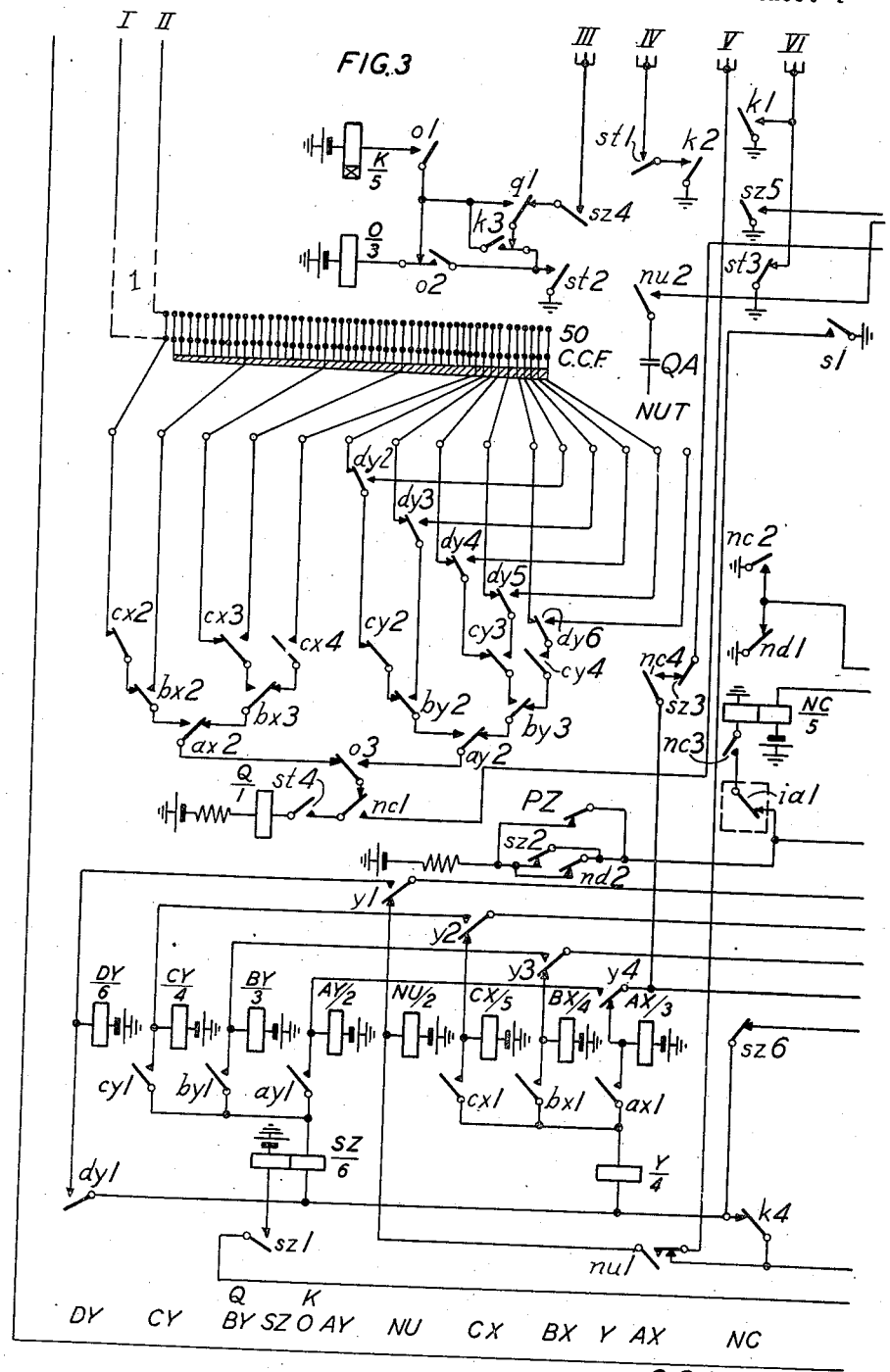

Earth via r5, NS winding, lead VII, s2, Fig. 3, NSK, NC winding to battery causes NS and NC to energize, NS closes contacts alternative to the speak key make contacts so that CA, Fig. 1, energizes via ns1, lead IX, sd2. Relay ME, Fig. 3A, then operates via s5, lead XI, ns3 to ca4, and closes a circuit via me1 and lead XI for operating S and SD. ME locks via me4, s5, while S and SD hold via s5. CA then locks via ca3, lead VIII, to s3 and sd2 in parallel and CB operates in parallel therewith. Z operates via ns2, ns3, ca4 and prepares a ringing trip circuit via D, L, z3 and z4, z1 and z2, and the extension line. ND operates to nc5, and NS locks via ns4, lead XII, NSK to nc2.

NC may lock in either of two ways according to ringing conditions. When ringing return battery is on the positive wire (as opposed to battery on the negative wire from the junction line circuit) NC locks via MC3, ia1, NSK, DL contacts, lead VIII, ca7, to the positive junction wire, so that if the call is abandoned, NC immediately releases.

If, however, there is no direct current condition on the junction leads characteristic of ringing, as in the case of a manual main exchange, NC has an alternative locking circuit (not provided in the previous case) via mc3, ia1, and back contact of PZ in the ringing and tones circuit in parallel to back contacts nd2, sz2. As previously stated, PZ operates at half-minute intervals while the ringing and tones circuit is in use.

Interrupted earth is now connected via lead EEL, s4, sz3, nc4, y4 to operate AX which locks in series with Y via k4, nu1, s1. Contacts y4 now connect the same earth to AY which operates and locks in series with SZ to s1. Y and Z operate. As before, ST operated via ax3, k5, nu1, s1 when AX energized and closed a circuit for JFM, Fig. 1, via cb4, lead III, sz4, q1, k3, st2.

JF is stopped on the night line individual to the calling junction by Q; Q, st4, nc1, lead V, ns5, contacts individual to the junction, lead II, jumper to night line, jfm4, cb2. Operation of contacts q1 causes O and K to energize in turn, since change-over of contacts o3 no longer opens the circuit of Q. Contacts k4 and k5 release ST, AX, AY, and Y, but SZ is locked via sz1, nc5.

During release of K, earth via k2, st1, lead IV, cb3, energizes RR and CL and the extension is tested by H. ST, K and O release but RR and H when operated lock via cb5, lead VI and first k1 and later st3. The extension is rung via F and on reply F releases RR at f3 and is then itself released.

Relay IA operates to the extension loop; battery, IA winding, me2, SPXT, SPXC, lead XVI, ca6, D and L windings, z4, z2, rr3, h4, jfm2, subset loop, jfm1, h3, rr2, z1, z3, L and D windings, ca5, lead XV, SPXC, SPXT, me3, IA winding, earth.

Contacts ia1 release NC which releases ND, SZ, and NS (at nc2 and nd1). S and SD are released, followed by ME, CA and CB. The conversational connection is cut through and L operates, holding slow-release relay Z. Main exchange ringing is tripped, the connection is completed, and the attendant's circuit is completely released.

In the case where NC locks via back contact of PZ, opening of this contact while NC is energized releases NC, and the attendant's circuit and junction circuit return to normal. Another burst of ringing from the main exchange will then start another connection.

The attendant is provided with a junction test key JTK, Fig. 3A, operation of which energizes a relay JT controlling contacts associated with each junction speak key SK, Fig. 1. Closure of the JT contacts causes the lamps LL of all busy junctions to light via contacts br5, so that the attendant can choose an idle junction for an outgoing call. Of course, back contacts of BR could replace front contacts br5 and the lamps of idle junctions only lighted.

What is claimed is:

1. In a telephone system, an exchange, a plurality of subscribers' lines terminating in said exchange, a line incoming to said exchange, a switch, an attendant's equipment, means for establishing a connection from said incoming line to a desired subscriber's line including the operation of said switch and responsive to the operation of said attendant's equipment, and means for releasing said switch to open the connection between said subscriber's line and the incoming line and for reoperating said switch to establish a connection between said incoming line and another subscriber's line responsive to a second operation of said attendant's equipment.

2. In a telephone system, an exchange, a plurality of subscribers' lines terminating in said exchange, a line incoming to said exchange, a switch, an attendant's position including a set of keys, means responsive to the operation of said keys for operating said switch and connecting therethrough the incoming line to a corresponding subscriber's line, and means thereafter operative in response to the operation of said keys for releasing said switch to release the connection between said subscriber's line and the incoming line and for again operating said switch and connect therethrough the incoming line to a corresponding subscriber's line.

3. In a telephone system, an exchange, a plurality of subscribers' lines terminating in said exchange, a line incoming to said exchange, a switch, an attendant's position including a key sending equipment, two relays, means responsive to the operation of said key sending equipment in accordance with a subscriber's designation for operating said switch and connecting said incoming line to the corresponding subscriber's line including the operation of said relays in different combinations depending on whether the called subscriber is busy, whether he does not answer, or if he has answered, and means thereafter operative in response to the operation of said key sending equipment a second time in accordance with a subscriber's designation for releasing said switch to release said connection and for again operating said switch and connect the incoming line to said corresponding subscriber's line.

4. In a telephone system, an exchange, a plurality of subscriber's lines terminating in said exchange, a line incoming to said exchange, a switch, an attendant's equipment, means controlled by a single setting of said attendant's equipment for actuating said switch to establish a connection therethrough between said incoming line and any one of said subscribers' lines, means thereafter controlled by a single second setting of said attendant's equipment for effacing said first connection through said switch and for reoperating said switch to establish a new connection therethrough between said incoming line and any one of said subscribers' lines.

5. In a telephone system, an exchange, a plurality of subscribers' lines terminating in said exchange, a line incoming to said exchange, a switch, an attendant's key equipment, means responsive to a single setting of said key equipment for operating said switch to establish a connection therethrough between said incoming line and a corresponding subscriber's line, and means thereafter responsive to a second single operation of said key equipment for effacing said first connection through said switch and reoperating said switch to establish therethrough a connection between said incoming line and a corresponding subscriber's line.

6. In a telephone system, an exchange, a plurality of subscribers' lines terminating in said exchange, a line incoming to said exchange, a switch, an attendant's position including a key sending equipment, two relays, means responsive to the operation of said key sending equipment in accordance with a subscriber's designation for operating said switch and connecting therethrough said incoming line to the corresponding subscriber's line including the operation of one of said relays in case the called subscriber's line is busy, the operation of both of said relays if the called subscriber does not answer and the operation of the other of said relays if the called subscriber has answered the call, and means thereafter operative in response to the operation of said key sending equipment a second time in accordance with a subscriber's designation for releasing said first connection and for again operating said switch and connecting the incoming line through said switch to said corresponding subscriber's line.

7. In a telephone system, an exchange, a plurality of subscribers' lines terminating in said exchange, a line incoming to said exchange, a switch, an attendant's position including a key sending equipment, two relays, means responsive to the operation of said key sending equipment in accordance with a subscriber's designation for operating said switch and connecting therethrough said incoming line to the corresponding subscriber's line including the operation of one of said relays in case the called subscriber's line is busy, the operation of both of said relays if the called subscriber does not answer and the operation of the other of said relays if the called subscriber has answered the call, and means thereafter operative in response to the operation of said key sending equipment a second time in accordance with a subscriber's designation for releasing the relay or relays operated during the establishing of said first-mentioned connection to release it and for again operating said switch and connecting the incoming line to said second corresponding subscriber's line.

GEORGE C. HARTLEY.
M. SUSAN SNELL.